US012027309B2

(12) United States Patent
Iwamoto et al.

(10) Patent No.: US 12,027,309 B2
(45) Date of Patent: Jul. 2, 2024

(54) SUPERCONDUCTING ELECTROMAGNET DEVICE

(71) Applicant: Canon Medical Systems Corporation, Tochigi (JP)

(72) Inventors: Naoki Iwamoto, Tokyo (JP); Masayoshi Oya, Tokyo (JP); Hajime Tanabe, Tokyo (JP)

(73) Assignee: Canon Medical Systems Corporation, Tochigi (JP)

( * ) Notice: Subject to any disclaimer, the term of this patent is extended or adjusted under 35 U.S.C. 154(b) by 107 days.

(21) Appl. No.: 17/907,971

(22) PCT Filed: Apr. 20, 2020

(86) PCT No.: PCT/JP2020/017079
§ 371 (c)(1),
(2) Date: Aug. 30, 2022

(87) PCT Pub. No.: WO2021/214837
PCT Pub. Date: Oct. 28, 2021

(65) Prior Publication Data
US 2023/0111502 A1 Apr. 13, 2023

(51) Int. Cl.
*H01F 6/04* (2006.01)
*H01F 6/06* (2006.01)

(52) U.S. Cl.
CPC ................. *H01F 6/04* (2013.01); *H01F 6/06* (2013.01)

(58) Field of Classification Search
CPC .................................... H01F 6/04; H01F 6/06
See application file for complete search history.

(56) References Cited

U.S. PATENT DOCUMENTS 5,934,078 A * 8/1999 Lawton, Jr. ............. F25B 21/00 62/3.1
2014/0329688 A1 11/2014 Aoki et al.
2021/0057134 A1 2/2021 Iwamoto et al.

FOREIGN PATENT DOCUMENTS

CN 102809239 A * 12/2012 ......... G01R 33/3804
DE 19914778 A1 * 10/1999 .............. F17C 3/085
(Continued)

OTHER PUBLICATIONS

International Search Report and Written Opinion mailed on Jul. 14, 2020, received for PCT Application PCT/JP2020/017079, filed on Apr. 20, 2020, 8 pages including English Translation.

*Primary Examiner* — Mohamad A Musleh
(74) *Attorney, Agent, or Firm* — XSENSUS LLP

(57) ABSTRACT

A spool has a cylindrical outer shape extending in an axial direction intersecting an upward/downward direction, the spool having an outer circumferential surface in which a plurality of annular groove portions extending in a circumferential direction are formed with a space being interposed between the plurality of annular groove portions in the axial direction, a superconducting coil being wound and accommodated inside each of the plurality of annular groove portions. A cover portion is attached to the spool so as to cover each of the plurality of annular groove portions, the cover portion and the plurality of annular groove portions forming a plurality of annular flow paths for refrigerant to cool the superconducting coil. One or more communication paths extend in parallel with the axial direction to communicate adjacent annular flow paths of the plurality of annular flow paths with each other.

9 Claims, 3 Drawing Sheets

(56) References Cited

FOREIGN PATENT DOCUMENTS

| | | | | | |
|---|---|---|---|---|---|
| GB | 2529897 | A | * | 3/2016 | .............. F17C 13/00 |
| JP | 58-40803 | A | | 3/1983 | |
| JP | 59-12003 | B2 | | 3/1984 | |
| JP | 2013-118228 | A | | 6/2013 | |
| WO | WO-2011122403 | A1 | * | 10/2011 | ......... G01R 33/3815 |
| WO | WO-2013080986 | A1 | * | 6/2013 | ......... G01R 33/3815 |
| WO | 2019/198266 | A1 | | 10/2019 | |

* cited by examiner

SUPERCONDUCTING ELECTROMAGNET DEVICE

CROSS-REFERENCE TO RELATED APPLICATION

The present application is based on PCT filing PCT/JP2020/017079, filed Apr. 20, 2020, the entire contents of which are incorporated herein by reference.

TECHNICAL FIELD

The present disclosure relates to a superconducting electromagnet device.

BACKGROUND ART

Japanese Patent Laying-Open No. 2013-118228 (PTL 1) is a prior art document that discloses a configuration of a superconducting electromagnet device. The superconducting electromagnet device described in PTL 1 includes a refrigerant circulation flow path, a refrigerator, a superconducting coil, and a protection resistor.

CITATION LIST

Patent Literature

PTL 1: Japanese Patent Laying-Open No. 2013-118228

SUMMARY OF INVENTION

Technical Problem

In the superconducting electromagnet device described in PTL 1, a large amount of refrigerant is required to suppress occurrence of quench due to an increase in temperature of the superconducting coil during magnetization and demagnetization of the superconducting coil.

The present disclosure has been made to solve the above-described problems, and has an object to provide a superconducting electromagnet device so as to suppress occurrence of quench of a superconducting coil during magnetization and demagnetization of the superconducting coil while reducing an amount of use of refrigerant.

Solution to Problem

A superconducting electromagnet device according to the present disclosure includes a superconducting coil, a spool, a cover portion, a refrigerant circulation flow path, a refrigerator, and a communication path. The spool has a cylindrical outer shape extending in an axial direction intersecting an upward/downward direction. The spool has an outer circumferential surface in which a plurality of annular groove portions extending in a circumferential direction are formed with a space being interposed between the plurality of annular groove portions in the axial direction. The superconducting coil is wound and accommodated inside each of the plurality of annular groove portions. The cover portion is attached to the spool so as to cover each of the plurality of annular groove portions. The cover portion and the plurality of annular groove portions form a plurality of annular flow paths for refrigerant to cool the superconducting coil. The refrigerant circulation flow path is provided to circulate the refrigerant. The refrigerant circulation flow path is connected to the plurality of annular flow paths. The refrigerator cools the refrigerant in the refrigerant circulation flow path. One or more communication paths extend in parallel with the axial direction to communicate adjacent annular flow paths of the plurality of annular flow paths with each other.

Advantageous Effects of Invention

According to the present disclosure, since the plurality of annular groove portions formed in the spool and the cover portion attached to the spool form the plurality of annular flow paths for the refrigerant to cool the superconducting coil and the adjacent annular flow paths communicate with each other through the communication paths, occurrence of quench of the superconducting coil can be suppressed during magnetization and demagnetization of the superconducting coil while reducing an amount of use of the refrigerant.

DESCRIPTION OF EMBODIMENTS

Figure 1:
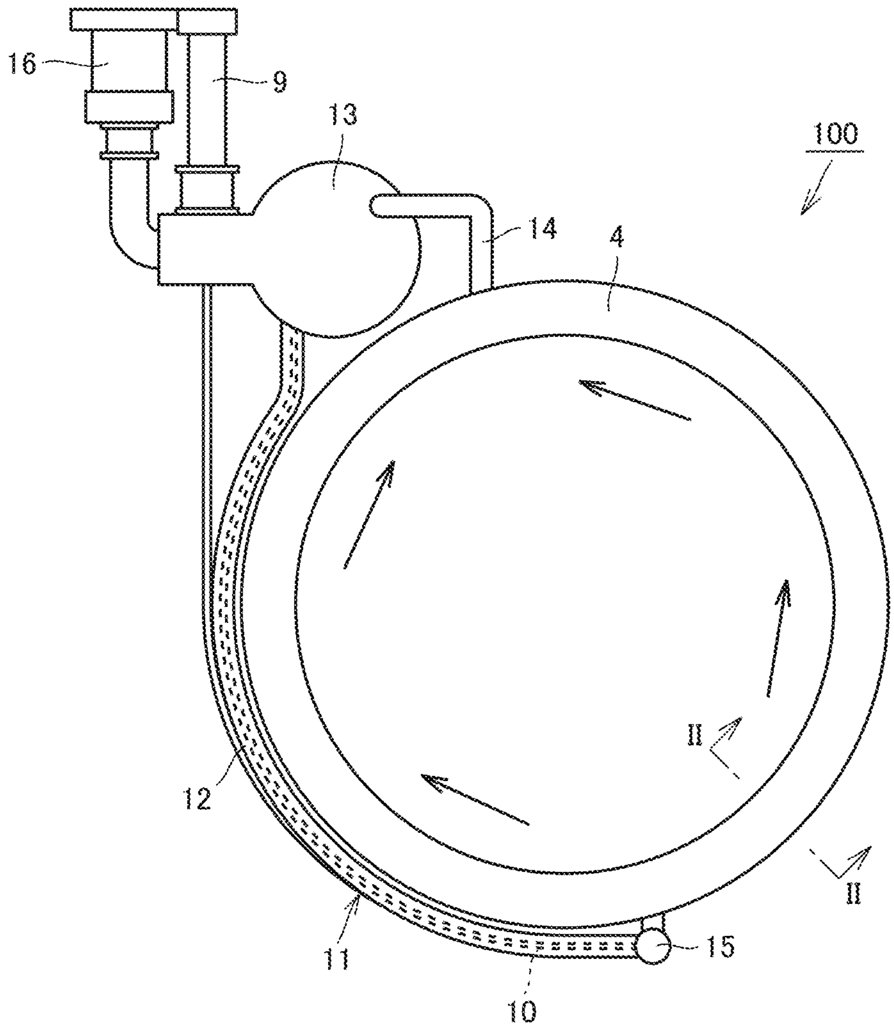
FIG. 1 is a front view showing a configuration of a superconducting electromagnet device according to a first embodiment.

Hereinafter, a superconducting electromagnet device according to each of embodiments will be described with reference to figures. In the description of the embodiments below, the same or corresponding portions in the figures are denoted by the same reference characters, and will not be described repeatedly.

First Embodiment

Figure 2:
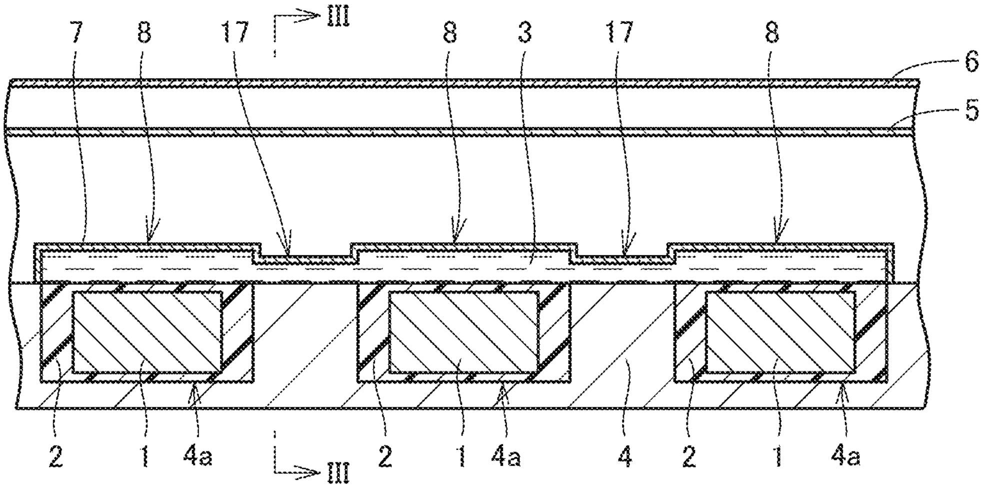
FIG. 2 is a partial cross sectional view of the superconducting electromagnet device of FIG. 1 when viewed in a direction of arrowed line II-II.

FIG. 1 is a front view showing a configuration of a superconducting electromagnet device according to a first embodiment. FIG. 2 is a partial cross sectional view of the superconducting electromagnet device of FIG. 1 when viewed in a direction of arrowed line II-II. In FIG. 1, a heat shield 5 and a vacuum container 6, which will be described later, are not shown.

As shown in FIGS. 1 and 2, a superconducting electromagnet device 100 includes a superconducting coil 1, a spool 4, a cover portion 7, a refrigerant circulation flow path 11, a refrigerator 16, and communication paths 17.

Superconducting coil 1 is insulated by covering a surface of superconducting coil 1 with an insulating member 2. Superconducting coil 1 makes contact with refrigerant 3 with insulating member 2 being interposed therebetween, and is accordingly cooled to a temperature of less than or equal to the critical temperature. In the present embodiment, refrigerant 3 is helium.

Spool 4 has a cylindrical outer shape extending in an axial direction intersecting an upward/downward direction, and has flanges at both ends in the axial direction. Spool 4 has an outer circumferential surface in which a plurality of annular groove portions 4*a* extending in a circumferential direction are formed with a space being interposed between the plurality of annular groove portions 4*a* in the axial direction, the outer circumferential surface being located between the flanges. Superconducting coil 1 covered with insulating member 2 is wound and accommodated inside each of the plurality of annular groove portions 4*a*.

As shown in FIG. 2, superconducting electromagnet device 100 according to the present embodiment further includes heat shield 5 and vacuum container 6. Heat shield 5 covers the outer side of spool 4 with a gap being interposed between heat shield 5 and spool 4. Vacuum container 6 is provided outside heat shield 5. The inside of vacuum container 6 is maintained in a vacuum state. Superconducting electromagnet device 100 has a vacuum heat insulating structure inside vacuum container 6.

Cover portion 7 is attached to spool 4 so as to cover each of the plurality of annular groove portions 4*a*. Cover portion 7 is attached to spool 4 by welding, for example. Cover portion 7 also covers a region of the outer circumferential surface of spool 4 between annular groove portions 4*a* adjacent in the axial direction. Cover portion 7 is constituted of a plate member that has a substantially cylindrical shape and that externally covers a whole of the plurality of annular groove portions 4*a*.

Cover portion 7 and the plurality of annular groove portions 4*a* form a plurality of annular flow paths 8 for refrigerant 3 to cool superconducting coil 1. Refrigerant 3 in a liquid phase flows inside each of the plurality of annular flow paths 8. That is, inner spaces between the plurality of annular flow paths 8 and cover portion 7 serve as the plurality of annular flow paths 8 through which refrigerant 3 flows in the circumferential direction of spool 4.

The cross sectional area of each of the plurality of annular flow paths 8 when viewed in the circumferential direction of spool 4 is set such that an amount of refrigerant 3 required to satisfy cooling performance during an operation and initial cooling performance at the time of starting the operation can flow therethrough. Further, in order to reduce the amount of refrigerant 3, a distance between cover portion 7 and superconducting coil 1 installed in annular groove portion 4*a* as shown in FIG. 2 may be made smaller than the depth of annular groove portion 4*a*.

As shown in FIG. 1, refrigerant circulation flow path 11 includes a refrigerant pipe 12, an upper tank 13, an upper header 14, and a lower header 15. As shown in FIG. 1, refrigerant pipe 12 extends along the outer circumferential surface of spool 4 with a gap being interposed therebetween. The inside of refrigerant pipe 12 is filled with refrigerant 3 in the liquid phase. The upper end of refrigerant pipe 12 is connected to upper tank 13. The lower end of refrigerant pipe 12 is connected to lower header 15.

Upper header 14 is connected to upper tank 13, and is branched and connected to an upper portion of each of the plurality of annular flow paths 8. Lower header 15 is connected to refrigerant pipe 12 and is branched and connected to a lower portion of each of the plurality of annular flow paths 8. Thus, refrigerant circulation flow path 11 is formed to allow refrigerant 3 to circulate through upper tank 13, refrigerant pipe 12, lower header 15, the plurality of annular flow paths 8, and upper header 14.

Refrigerator 16 cools refrigerant 3 in refrigerant circulation flow path 11. Specifically, a refrigeration stage at the tip of refrigerator 16 is connected to the upper portion of upper tank 13.

As shown in FIG. 2, each of communication paths 17 extends in parallel with the axial direction of spool 4 to communicate adjacent annular flow paths 8 of the plurality of annular flow paths 8 with each other.

Figure 3:
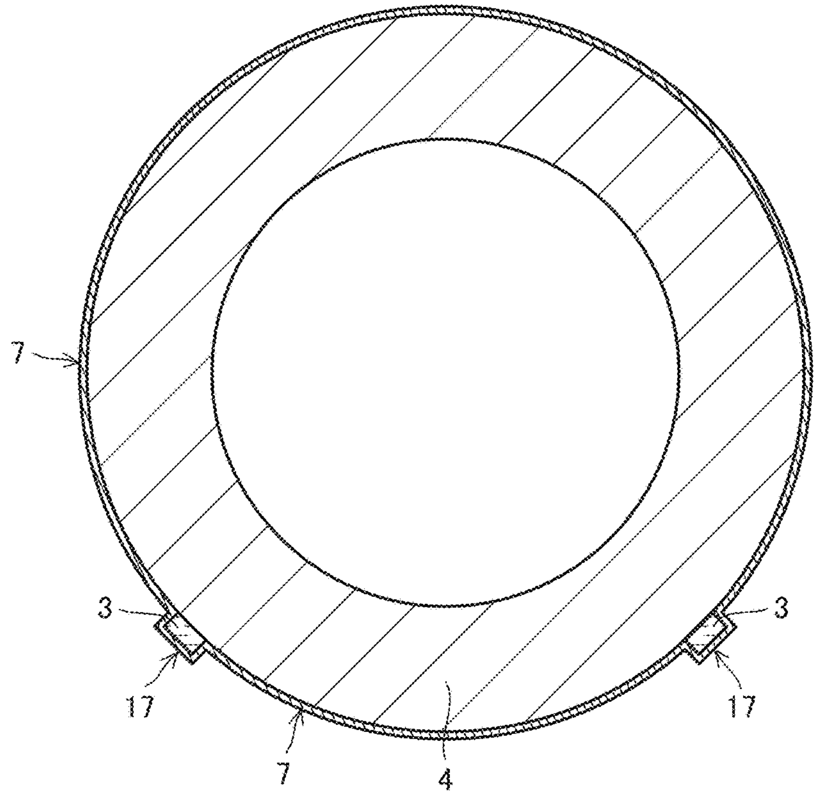
FIG. 3 is a cross sectional view of the superconducting electromagnet device of FIG. 2 when viewed in a direction of arrowed line III-III.

FIG. 3 is a cross sectional view of the superconducting electromagnet device of FIG. 2 when viewed in a direction of arrowed line III-III. As shown in FIGS. 2 and 3, in the present embodiment, communication path 17 is formed by a gap between spool 4 and cover portion 7. Specifically, part of the inner surface of cover portion 7 facing the outer circumferential surface of spool 4 and located between annular flow paths 8 has a portion separated from the outer circumferential surface of spool 4, thereby forming a gap between the inner surface of cover portion 7 and the outer circumferential surface of spool 4 located between annular flow paths 8. This gap serves as communication path 17.

It should be noted that communication path 17 is not limited to communication path 17 formed by the gap between spool 4 and cover portion 7, and communication path 17 may be formed by a through hole formed in spool 4, or may be formed by a gap secured between the annular cover portion and the outer circumferential surface of spool 4 by installing resin or metal spacers disposed with a space being interposed therebetween on the outer circumferential surface of spool 4 in the circumferential direction of spool 4. Instead of the through hole extending in the axial direction, a groove extending in the axial direction may be provided in the outer circumferential surface of spool 4 to form communication path 17.

In the present embodiment, as shown in FIG. 3, at the lower side position of spool 4, one communication path 17 is provided at the left side position of spool 4 and one communication path 17 is provided at the right side position of spool 4. The cross sectional area of communication path 17 when viewed in the axial direction of spool 4 may be any cross sectional area as long as refrigerant 3 in the liquid phase can be replenished through communication path 17 as described later, and may be smaller than the cross sectional area of each of the plurality of annular flow paths 8. For example, the cross sectional area of communication path 17 is more than or equal to 1/20 and less than or equal to 1/10 of the cross sectional area of each of the plurality of annular flow paths 8 when viewed in the circumferential direction of spool 4. By providing communication path 17 having such a small cross sectional area, not only refrigerant 3 in the liquid phase can be replenished to each annular flow path 8, but also the amount of refrigerant 3 can be reduced.

Superconducting electromagnet device 100 according to the present embodiment further includes a protection resistor 10 and a current lead 9 shown in FIG. 1. Protection resistor 10 is disposed inside refrigerant pipe 12. Protection resistor 10 has a function of preventing deteriorated performance or burning of superconducting coil 1 when quench occurs. Protection resistor 10 is electrically connected to superconducting coil 1 in parallel. When superconducting coil 1 is magnetized and demagnetized, power is applied to protection resistor 10 to generate heat transiently. Although the transverse cross sectional shape of protection resistor 10 in the present embodiment is a rectangular shape, the transverse cross sectional shape of protection resistor 10 is not limited to the rectangular shape and may be an annular shape or a circular shape.

Current lead 9 is connected to superconducting coil 1 through upper tank 13 and refrigerant pipe 12. In superconducting coil 1, a portion located inside one annular flow path 8 and a portion located inside another annular flow path 8 adjacent to the one annular flow path 8 are coupled to each other inside upper tank 13 or inside annular flow path 8.

Here, the flow of refrigerant 3 in superconducting electromagnet device 100 during a normal operation will be described. The liquid level of refrigerant 3 is located in upper tank 13. That is, the lower portion inside upper tank 13 is filled with refrigerant 3. A main cause of heat generation of superconducting coil 1 in superconducting electromagnet device 100 during the normal operation is heat input from the outside through vacuum container 6 and heat shield 5.

The density of refrigerant 3 located inside each of the plurality of annular flow paths 8 is decreased due to the heat input from the outside. Therefore, upward flows of refrigerant 3 are generated inside each of the plurality of annular flow paths 8. As indicated by arrows in FIG. 1, refrigerant 3 is branched to flow oppositely in each of the plurality of annular flow paths 8 in the circumferential direction of spool 4.

The upward flows of refrigerant 3 in each of the plurality of annular flow paths 8 pass through upper header 14 and are merged to flow into upper tank 13. The refrigerant in upper tank 13 is cooled by refrigerator 16 to have increased density. As a result, refrigerant 3 flows from upper tank 13 into lower header 15. Refrigerant 3 branched at lower header 15 flows into each of the plurality of annular flow paths 8. Thus, refrigerant 3 circulates in refrigerant circulation flow path 11 due to the difference in density of refrigerant 3.

Next, the following describes a transient heat generation phenomenon of superconducting coil 1 in superconducting electromagnet device 100 during magnetization and demagnetization of superconducting coil 1. In superconducting electromagnet device 100 during the magnetization and demagnetization of superconducting coil 1, power is applied to protection resistor 10 to transiently generate heat, with the result that a portion of superconducting coil 1 may generate heat due to influences of this thermal factor, strain, and the like. In this case, refrigerant 3 in the liquid phase is reduced by vaporization of refrigerant 3 in annular flow path 8 in which the heat generation portion of superconducting coil 1 is accommodated. An amount of refrigerant 3 in the liquid phase corresponding to the amount of decrease is replenished through lower header 15; however, when a long time is required to replenish refrigerant 3 in the liquid phase, the temperature of the heat generation portion of superconducting coil 1 may be further increased to result in occurrence of quench.

Therefore, in superconducting electromagnet device 100 according to the present embodiment, since adjacent annular flow paths 8 communicate with each other through communication path 17, refrigerant 3 in the liquid phase can be replenished, through lower header 15, to annular flow path 8 in which the heat generation portion of superconducting coil 1 is accommodated, and refrigerant 3 in the liquid phase can be replenished through communication path 17 from annular flow path 8 adjacent to annular flow path 8 in which the heat generation portion of superconducting coil 1 is accommodated to annular flow path 8 in which the heat generation portion of superconducting coil 1 is accommodated. Therefore, the time required to replenish can be reduced as compared with a case where refrigerant 3 in the liquid phase is replenished only through lower header 15. Thus, the heat generation portion of superconducting coil 1 can be cooled promptly, thereby suppressing occurrence of quench of superconducting coil 1.

It should be noted that the positions of communication paths 17 are not limited to the positions shown in FIG. 3. Here, the positions of communication paths 17 in a superconducting electromagnet device according to each of modifications of the present embodiment will be described.

Figure 4:
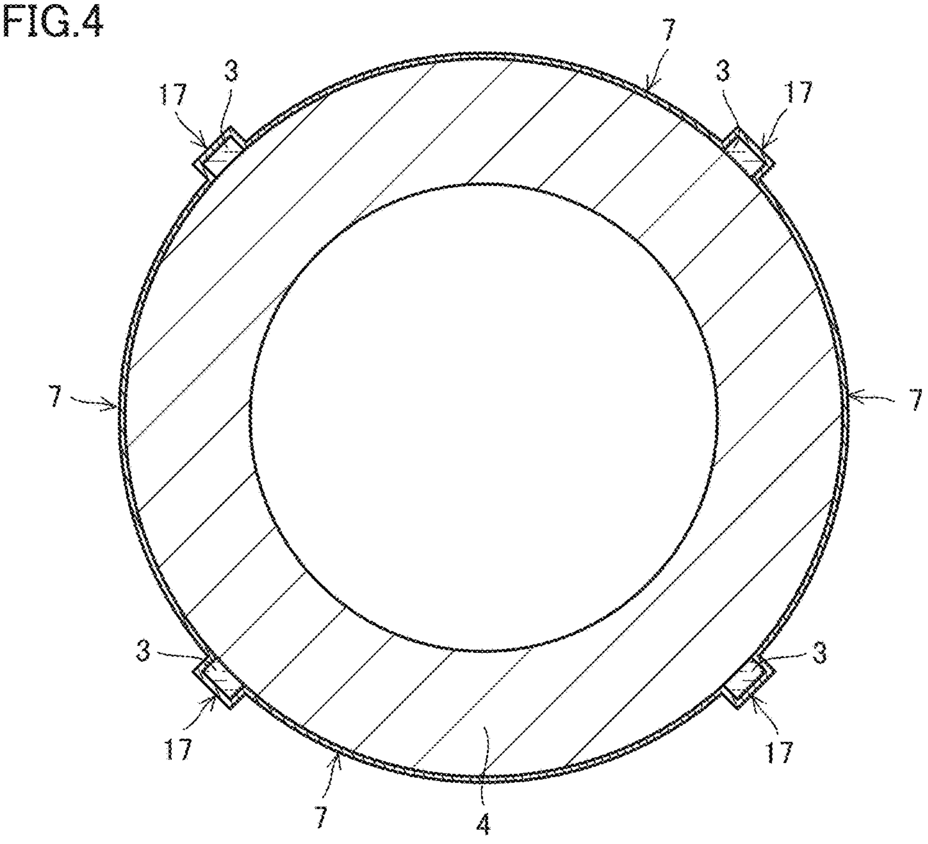
FIG. 4 is a cross sectional view showing positions of communication paths in a superconducting electromagnet device according to a first modification of the first embodiment.

FIG. 4 is a cross sectional view showing positions of communication paths in a superconducting electromagnet device according to a first modification of the first embodiment. FIG. 4 shows the cross section when viewed in the same direction as that in FIG. 3. As shown in FIG. 4, in the superconducting electromagnet device according to the first modification, communication paths 17 are provided at equal intervals in the circumferential direction of spool 4. In the first modification, communication paths 17 are disposed at four positions at equal intervals, but the number of the positions at which communication paths 17 are disposed is not limited to four as long as communication paths 17 are disposed at a plurality of positions.

Figure 5:
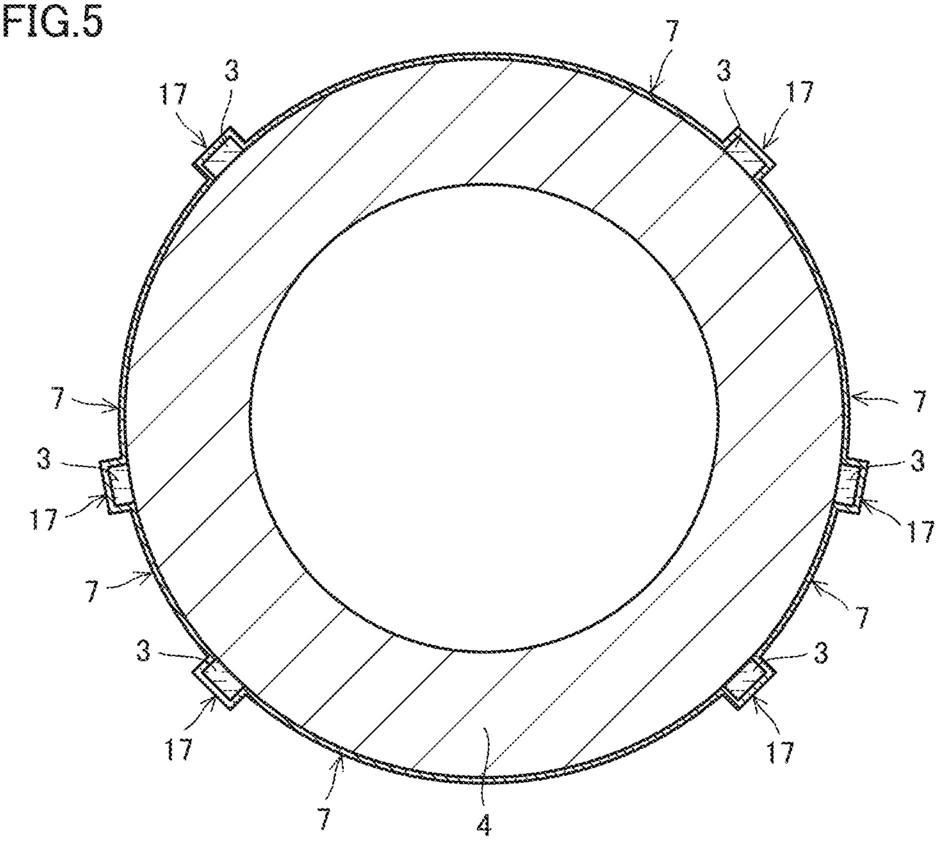
FIG. 5 is a cross sectional view showing positions of communication paths in a superconducting electromagnet device according to a second modification of the first embodiment.

FIG. 5 is a cross sectional view showing positions of communication paths in a superconducting electromagnet device according to a second modification of the first embodiment. FIG. 5 shows the cross section when viewed in the same direction as that in FIG. 3. As shown in FIG. 5, in the superconducting electromagnet device according to the second modification, the number of communication paths 17 disposed in the lower half of the spool is larger than the number of communication paths 17 disposed in the upper half of the spool. In the second modification, communication paths 17 are disposed at six positions, but the number of the positions at which communication paths 17 are disposed is not limited to six, and communication path(s) 17 may be disposed at one or more positions.

In superconducting electromagnet device 100 according to the first embodiment, since the plurality of annular groove portions 4*a* formed in spool 4 and cover portion 7 attached to spool 4 form the plurality of annular flow paths 8 for refrigerant 3 to cool superconducting coil 1 so as to communicate adjacent annular flow paths 8 with each other through communication paths 17, the heat generation portion of superconducting coil 1 can be cooled promptly by using refrigerant 3 inside the plurality of annular flow paths 8, with the result that occurrence of quench of superconducting coil 1 can be suppressed during magnetization and demagnetization of superconducting coil 1 while reducing the amount of use of refrigerant 3. Further, since superconducting coil 1 is in contact with refrigerant 3 with insulating member 2 being interposed therebetween inside annular flow path 8, heat resistance between superconducting coil 1 and refrigerant 3 can be reduced to effectively cool superconducting coil 1.

In superconducting electromagnet device 100 according to the first embodiment, since communication path 17 is formed by the gap between spool 4 and cover portion 7, the size of the gap can be adjusted by the shape of cover portion 7, so that the amount of the refrigerant flowing through communication path 17 can be set appropriately without changing the shape of spool 4.

In the superconducting electromagnet device according to the first modification of the first embodiment, since communication paths 17 are disposed at equal intervals in the circumferential direction of spool 4, refrigerant 3 in the liquid phase can be replenished, through communication paths 17 located near the heat generation portion of superconducting coil 1, to annular flow path 8 in which the heat generation portion of superconducting coil 1 is accommodated. As a result, the heat generation portion of superconducting coil 1 can be cooled promptly, thereby suppressing occurrence of quench of superconducting coil 1.

In the superconducting electromagnet device according to the second modification of the first embodiment, since the number of communication paths 17 disposed in the lower half of spool 4 is larger than the number of communication paths 17 disposed in the upper half of spool 4, refrigerant 3 in the liquid phase can be replenished, through communication paths 17 located in the lower half of spool 4 in which the liquid pressure of refrigerant 3 is relatively high, to annular flow path 8 in which the heat generation portion of superconducting coil 1 is accommodated. As a result, the heat generation portion of superconducting coil 1 can be cooled promptly, thereby suppressing occurrence of quench of superconducting coil 1.

Second Embodiment

Hereinafter, a superconducting electromagnet device according to a second embodiment will be described. Since the superconducting electromagnet device according to the second embodiment is different from that of the first embodiment only in terms of the configuration of the communication path, the other configurations will not be described repeatedly.

Figure 6:
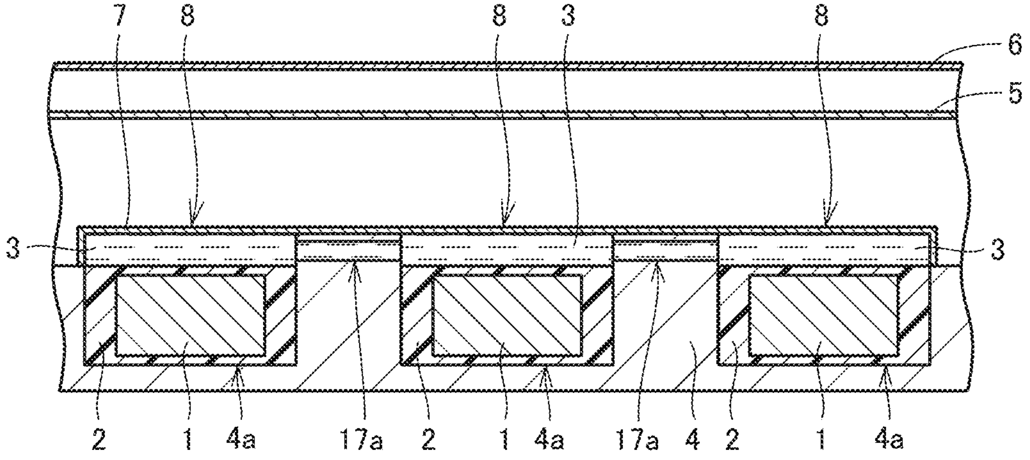
FIG. 6 is a cross sectional view showing a superconducting electromagnet device according to a second embodiment.

FIG. 6 is a cross sectional view showing the superconducting electromagnet device according to the second embodiment. As shown in FIG. 6, cover portion 7 is attached to spool 4 in contact with the outer circumferential surface of spool 4 between annular groove portions 4*a* so as to cover each of the plurality of annular groove portions 4*a*.

In spool 4, a through hole is formed between annular groove portions 4*a* on the outer circumferential side with respect to superconducting coil 1 and insulating member 2 so as to extend therethrough in parallel with the axial direction of spool 4. That is, the outer diameter of spool 4 is larger than the outer diameter of each of superconducting coil 1 and insulating member 2. In the present embodiment, a communication path 17*a* is formed by the through hole formed in spool 4. The through hole is provided before attaching cover portion 7 to spool 4.

In the superconducting electromagnet device according to the second embodiment, the plurality of annular groove portions 4*a* formed in spool 4 and cover portion 7 attached to spool 4 form the plurality of annular flow paths 8 for refrigerant 3 to cool superconducting coil 1. Further, since adjacent annular flow paths 8 communicate with each other through communication path 17*a* formed in spool 4, occurrence of quench of superconducting coil 1 can be suppressed during magnetization and demagnetization of superconducting coil 1 while reducing the amount of use of refrigerant 3.

In the superconducting electromagnet device according to the second embodiment, since communication path 17*a* is formed by the through hole formed in spool 4, the shape of cover portion 7 can be simplified.

It should be noted that the above-described embodiments disclosed herein are illustrative in any respects, and are not intended to be a basis for restrictive interpretation. Therefore, the technical scope of the present disclosure should not be interpreted based only on the embodiments described above. Any modifications within the scope and meaning equivalent to the terms of the claims are included. In the description of the above-described embodiments, configurations that can be combined may be combined with each other.

REFERENCE SIGNS LIST

1: superconducting coil; 2: insulating member; 3: refrigerant; 4: spool; 4*a*: annular groove portion; 5: heat shield; 6: container; 7: cover portion; 8: annular flow path; 9: current lead; 10: protection resistor; 11: refrigerant circulation flow path; 12: refrigerant pipe; 13: upper tank; 14: upper header; 15: lower header; 16: refrigerator; 17, 17*a*: communication path; 100: superconducting electromagnet device.

The invention claimed is:

1. A superconducting electromagnet device comprising:

a superconducting coil;

an insulating member to cover the superconducting coil;

a spool having a cylindrical outer shape extending in an axial direction intersecting an upward downward direction, the spool having an outer circumferential surface in which a plurality of annular groove portions extending in a circumferential direction are formed with a space being interposed between the plurality of annular groove portions in the axial direction, the superconducting coil being wound and accommodated inside each of the plurality of annular groove portions;

a. cover portion attached to the spool so as to cover each of the plurality of annular groove portions, the cover portion and the plurality of annular groove portions forming a plurality of annular flow paths for refrigerant to cool the superconducting coil;

a refrigerant circulation flow path to circulate the refrigerant, the refrigerant circulation flow path being connected to the plurality of annular flow paths;

a refrigerator to cool the refrigerant in the refrigerant circulation flow path; and one or more communication paths extending in parallel with the axial direction to communicate adjacent annular flow paths of the plurality of annular flow paths with each other, wherein each of the one or more communication paths is located on an outer circumferential side with respect to the superconducting coil and the insulating member.

2. The superconducting electromagnet device according to claim 1, wherein each of the one or more communication paths is formed by a gap between the spool and the cover portion.

3. The superconducting electromagnet device according to claim 1, wherein each of the one or more communication paths is formed by a through hole formed in the spool.

4. The superconducting electromagnet device according to claim 1, wherein the one or more communication paths are provided at equal intervals in the circumferential direction.

5. The superconducting electromagnet device according to claim 1, wherein the number of the one or more communication paths disposed in a lower half of the spool is larger than the number of the one or more communication paths disposed in an upper half of the spool.

6. The superconducting electromagnet device according to claim 2, wherein the one or more communication paths are provided at equal intervals in the circumferential direction.

7. The superconducting electromagnet device according to claim 3, wherein the one or more communication paths are provided at equal intervals in the circumferential direction.

8. The superconducting electromagnet device according to claim 2, wherein the number of the one or more communication paths disposed in a lower half of the spool is larger than the number of the one or more communication paths disposed in an upper half of the spool.

9. The superconducting electromagnet device according to claim 3, wherein the number of the one or more communication paths disposed in a lower half of the spool is larger than the number of the one or more communication paths disposed in an upper half of the spool.

* * * * *